June 29, 1965 C. A. HENN-COLLINS 3,192,506

ELECTRONIC INDICATOR SYSTEM MORE PARTICULARLY FOR USE IN MINES

Filed March 4, 1960 3 Sheets-Sheet 1

June 29, 1965 C. A. HENN-COLLINS 3,192,506

ELECTRONIC INDICATOR SYSTEM MORE PARTICULARLY FOR USE IN MINES

Filed March 4, 1960 3 Sheets-Sheet 2

June 29, 1965 C. A. HENN-COLLINS 3,192,506

ELECTRONIC INDICATOR SYSTEM MORE PARTICULARLY FOR USE IN MINES

Filed March 4, 1960 3 Sheets-Sheet 3

3,192,506

ELECTRONIC INDICATOR SYSTEM MORE PARTICULARLY FOR USE IN MINES

Christopher Arthur Henn-Collins, London, England, assignor to Sargrove Electronics Limited, Hounslow, England, a British company Filed Mar. 4, 1960, Ser. No. 12,816
6 Claims. (Cl. 340—171)

This invention relates to an electronic indicator system more particularly for use in mines.

An object of the present invention is to provide a safe and reliable system at a mine head for monitoring conditions such as that of electric control means, metering or other apparatus in the levels or galleries of the mine, the system employing high frequency currents in order that a relatively large number of channels, adequately spaced, may be available for the individual functions of the system.

According to the present invention there is provided an electronic indicator system adapted to indicate at a near station "all correct" or "failure" conditions at any one of a number of remote stations and comprising frequency sources such as oscillator units or other appropriate means for generating different frequencies each associated with electric control means or other apparatus to be monitored at one of the remote stations, means for controlling the generated frequencies, a power supply for the source units, a cable connecting the source units at the remote stations to the near station, common amplifying means at the near station for the signals received from the units at the remote stations, filter circuits corresponding in number and frequency to that of the units and indicating means at the near station connected to the output from each filter to indicate "all correct" or "failure" conditions at each of the remote stations.

The invention also includes the provision of a monitor check oscillator or frequency generating unit connected to the end of each spur or branch of the cable connecting the units in a level or gallery so that in the event of no signal output being obtained from the said unit, an indication of failure of the system on that particular spur or branch will be given.

In order that the invention may be more fully understood and readily carried into effect, reference is now directed to the accompanying diagrams in which.

Figure 1:
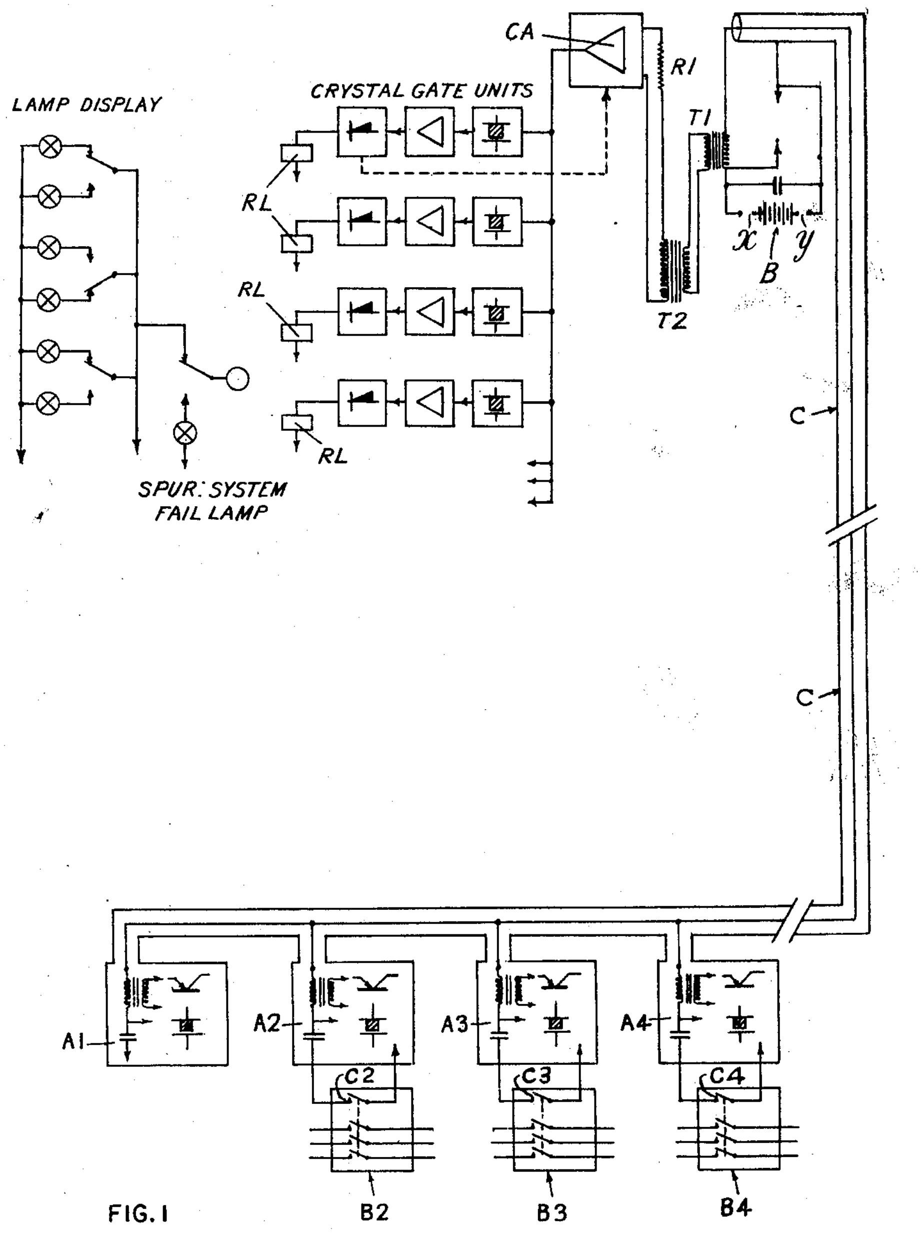
FIGURE 1 is a block schematic of the indicator system as applied to a mine.
Figure 2:
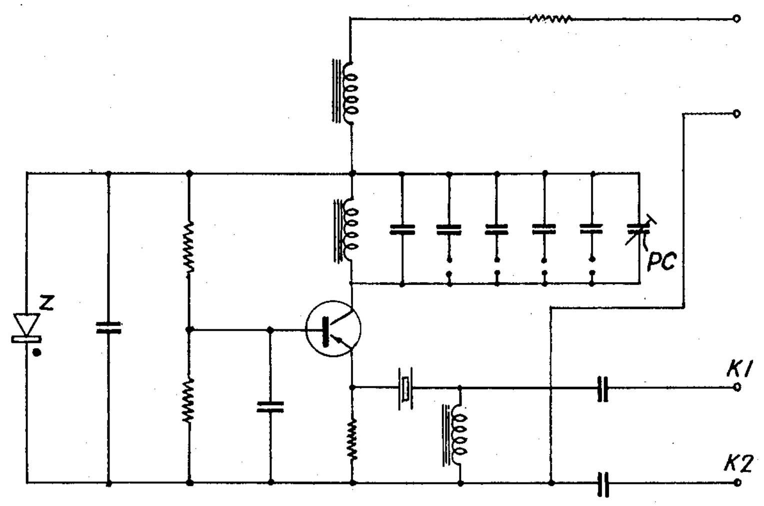
FIGURE 2 is a circuit diagram of one of the transistor crystal controlled oscillator units for association with apparatus to be monitored.

Referring to FIGURES 1 and 2, four crystal oscillator units A1, A2, A3 and A4 are shown, by way of example, the units A2, A3 and A4 serving to monitor circuit breakers indicated at B2, B3 and B4 or other apparatus in one gallery of a mine. These circuit breakers have auxiliary contacts C2, C3, C4 which control the transmitted output signal. It will be understood that any desired number of these units may be provided in a gallery according to the apparatus to be monitored.

These units, in multiples as required, are mounted in boxes with sealed terminations at both input and output ends. Electrically screened leads between the units and the supervisory switch contacts on the gate end boxes of the apparatus are not necessary, any approved twin cable sufficing. The unit A1 serves as a check oscillator for the system and will later be more fully described. The power to operate the units is fed either as D.C. or A.C. down a screened co-axial cable C and is applied to each unit as indicated in FIGURE 2. Conveniently, the H.F. output from each unit may be coupled into the cable for detection at the pit head.

In FIGURE 1 the arrows X and Y indicate the connections of a D.C. supply from a battery B to crystal oscillator units.

In order to provide a check against spurious operation of the system, cable faults or any other failure of the system, a check transistor crystal oscillator is connected to the extremity of each cable spur. In FIGURE 1 the unit A1 serves this purpose. If no output is obtained from a check oscillator, all responses on that particular spur having the check oscillator would be ignored thus indicating "System fail." It is preferred that the frequency of the check oscillator should be approximately in the centre of the frequency range of the oscillators. Referring to the circuit diagram of one of the transistor crystal oscillators, FIGURE 2, K1 and K2 indicate the keying contacts of the apparatus to be monitored, and the arrangement is such that when the contacts are closed, the oscillator ceases its function and, when open, the oscillator functions normally. This provides for the system to "Fail safe." Since H.F. currents are employed for monitoring, a large number of common oscillators are possible, each of different crystal frequency. For instance, in the frequency range between 70 and 130 kc./s. up to 240 individual functions may be monitored by the present system in each cable line, the oscillator frequencies being 250 cycles ±1 cycle apart. Since it is envisaged that in some mines this number of channels may be required and possibly more in a few cases, this frequency range may be extended by fitting suitable filters in the crystal gates to reduce 1st harmonic interference. It will be seen that frequencies will be available for additional oscillators and for "System failure" oscillator units at the ends of the spurs. Disconnection of any circuit breakers from the system at any time would not affect the system as a whole.

It is desirable that each of the crystal oscillator circuits should include a Zener diode Z, FIGURE 2. The diode Z serves to prevent damage to the oscillator units if insulation checks are made with a test instrument such as a megger. Each crystal oscillator circuit may also include padding condensers PC to enable tuning to any frequency suitable to any crystal that may be used.

At the pit head, the H.F. output from the oscillator units is fed to a common conventional amplifier CA indicated in FIGURE 1. For safety, connection is made to the common amplifier by means of two entirely separate transformers. The first of these indicated at T1, FIGure 1, is purely at 1–1 isolating transformer, whilst the second, indicated at T2, is a normal amplifying transformer having a high step-up ratio, e.g. some 70 ohms impedance to a very high secondary input to the grid-cathode circuit of the common amplifier. The primary of the transformer T2 is tuned to the centre frequency of the frequency band that it has to handle and the shunt effect of the resistive value across the primary, the "Q," is so reduced as to give a total band width of some 16 kc., 8 kc. each side of the centre frequency. One or more of these isolating transformers would have their windings on separate limbs of the transformer cores. In addition, a high value grid stopping resistor R1, say 1 megohm, FIGURE 1, may be inserted between the input to the common amplifier and the transformer T2. Thus, any possibility of surge feedback or D.C. voltage reflection into the main cable to the detriment of transistors in the oscillator units is obviated. As an alternative an isolation unit may be inserted between the cable termination and the common amplifier, the unit comprising the conventional arrangement of chokes and capacitors. It is desirable that the common amplifier should have negative feed-back in order to stabilise its gain.

The output from the common amplifier is fed to crystal gate units.

Figure 3:
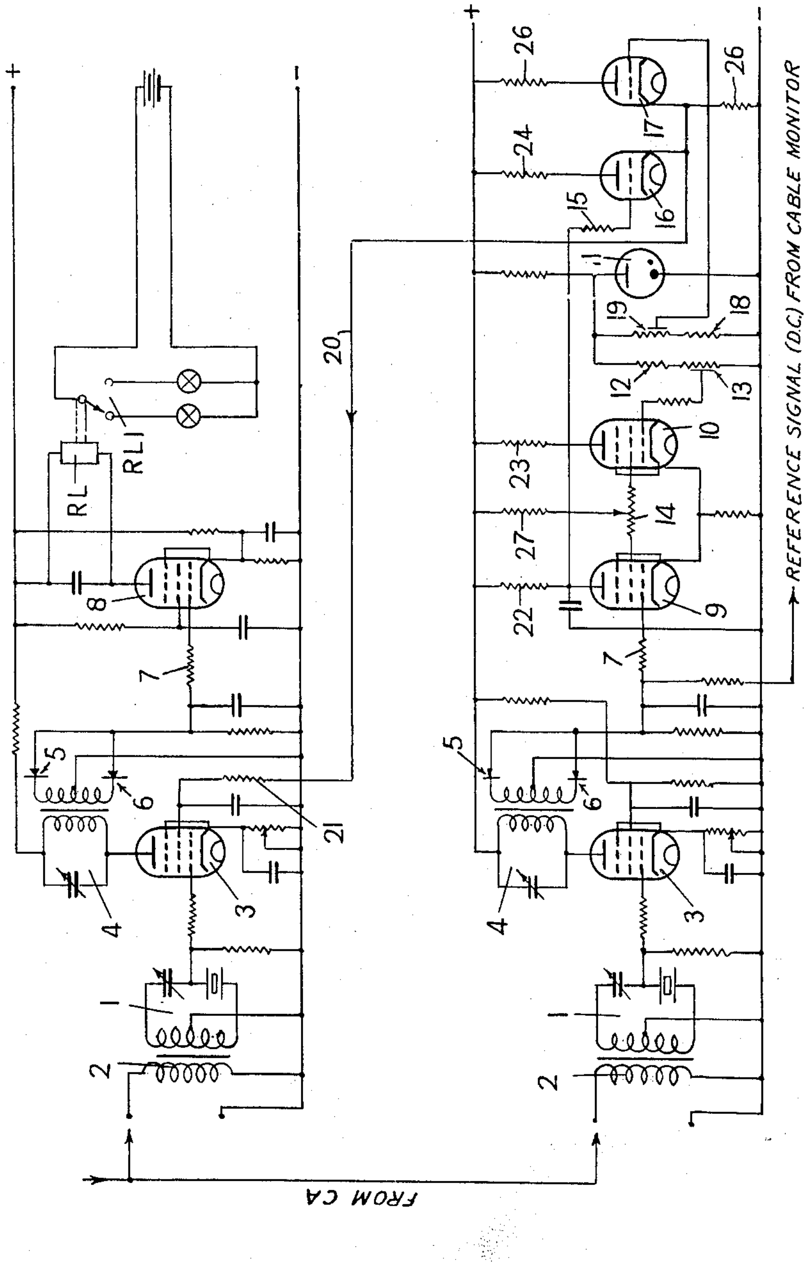
FIGURE 3 is a circuit diagram of one of the crystal gate units including a detector, an amplifier, and an automatic gain control unit for use with the common amplifier.

Referring to FIGURE 3, each crystal gate substantially comprises a crystal-stabilised oscillating circuit 1 which is inductively coupled through an associated winding 2 with the common amplifier, FIGURE 1, and feeds the grid of an amplifying valve 3. The amplified frequency is again filtered in a tuned anode circuit 4 and then full-wave-rectified by two rectifiers 5 and 6. The rectified signal is applied through a resistor 7 to the grid of an amplifying valve 8 in the anode circuit of which is a relay RL. This may be of the telephone type the contacts RL1 of which may be connected in a variety of ways to provide lamp displays or other signal indications as indicated in FIGURE 1. In one such arrangement, red and green lamps may be used for each indicator system so that lamp failure is self-evident and the system "Fails safe." Should the check frequency be absent, the appropriate relay would operate and light a "System fail" lamp and extinguish all other lamps on that particular spur. The "System fail" lamps, or alarm bells in lieu of lamps, could be powered by an entirely separate battery.

The crystal gate associated with the oscillator unit A1 incorporates automatic gain control whereby compensation may be made for any variations in cable attenuation such as may be caused by the addition of units, temperature or other ambient conditions. The control voltage for A.G.C. purposes may be taken from the output of one of the check units A1, since this should always be present under normal operating conditions, and its variation is representative of the attenuation characteristic of the entire cable length at any instant of time.

The crystal gate associated with the oscillator unit A1 is similar to the other crystal gates, excepting that the D.C. output signal is not fed to an amplifying stage but to the grid of an amplifying valve 9. For the purpose of stabilisation in the event of fluctuation of the supply voltage a further valve 10 is placed in parallel with amplifying valve 9 and its control grid receives a constant biasing potential from a thyraton 11 through potential dividers 12, 13. By means of a potentiometer 14 both valves can be zero balanced. The anode of valve 9 is directly connected through a resistor 15 with the grid of a triode 16 which—in the same way as valve 9—is stabilised against fluctuations in the supply cables by a parallel triode 17. The grid of the triode 17 is connected with the potential divider resistances 18 and 19 and is likewise maintained at constant potential by the thyratron 11. Valve 16 is operated as a cathode amplifier and the D.C. signal derived from the cathode is applied through a line 20 and a screen grid resistor 21 to the screen grid of valve 3. The cathodes of valves 9 and 10 and of valves 16 and 17 are interconnected and grounded through a common cathode resistor. The anode resistors 22 and 23 of valves 9 and 10, the anode resistors 24 and 25 as well as the common cathode resistor 26 of valves 16 and 17, the common screen grid resistor 27 of valves 9 and 10 as well as the input resistor for the thyratron 11 have conventional values.

The same applies to all the remaining components shown in FIGURE 3 which have not been specially mentioned, such as cathode and screen grid blocking condensers, filtering resistors, and so forth, which are well known in electronics engineering.

The automatic gain control shown in FIGURE 3 functions as follows:

When the amplitude of the frequency fed into the crystal gate is large, a correspondingly high D.C. voltage will appear at the control grid of valve 9 of the amplifying stage 8, and a correspondingly low voltage at the anode of valve 9 and hence at the grid of valve 16. Consequently, there will be a lower voltage at the cathode resistor 26 and at the screen grid of the pentode 3 of the crystal gate, so that the amplification of this valve is reduced. When the amplitude of the frequency from oscillator unit 1 is small, the converse processes take place so that amplification in pentode 3 will rise.

If D.C. is employed as the power source for transistor crystal oscillator units this may be obtained from a series of high capacity dry batteries. In view of the very high selectivity of the crystal filters and consequently the narrowness of their pass band, the system should be immune from any form of electrical interference. The main cable itself should not in any case pick up any interference by virtue of its screening and matching arrangements.

The current consumption for each of the units is approximately 100 microamperes, thus a complete system employing sixty such units may consume not more than 6 milliamps, this being the total D.C. flow on the main signalling cable. For protection and consistent operation the crystals are mounted in vacuum within a glass envelope. No difficulty is anticipated with regard to the operation of a transistor oscillator at temperatures up to some 55° C. Finally, it should be stated that for reasons of safety, all underground crystal-transistor units, main cable, battery, and the primary of the isolating transformer will be fully floating, no actual earthing being employed on these.

Although the system is particularly applicable to mines, it may be adapted for use in railway signalling and operation to monitor remote apparatus or control devices. In fact, the system may be readily adapted for use generally where the monitoring and control of remote conditions is required.

In the adaptation of the system to the control of apparatus at a remote station from a near station, either additionally or independently of the indicating system described, oscillatory units as described may be disposed at the near station, e.g. pit head, and the crystal gates for filtering the transmitted frequencies may be disposed at the remote stations, e.g. mine galleries, the system as previously described being in fact reversed. Instead of the output from the crystal gates being utilised to actuate signalling means, the output is used to control switches or other control means. If used in conjunction with the monitoring system described and a "failure" signal is received, a control frequency could be selected at the pit head and transmitted to the particular crystal gate tuned to that frequency, whereupon appropriate action could be initiated to remedy the failure.

I claim:

1. An electronic indicator system adapted to indicate at a near station "all correct" or "failure" conditions at any one of a number of remote stations, the system comprising crystal transistor oscillatory units each having a frequency different from the others and each coupled to electric control means of apparatus to be monitored at one of the remote stations, the coupling including contacts which, when closed, cause the unit to be inoperative and when open permit the unit to oscillate, thereby rendering the system to "fail safe," means for tuning each unit, a coaxial cable for transmitting the different frequencies of the units to the near station and also for supplying power to the units from the near station, a common amplifier at the near station for amplifying the outputs from the units, a crystal gate filter for each of the units, amplifying and detecting stages for the filters, and indicating means at the near station connected to the output from each filter to indicate "all correct" or "failure" conditions at each of the remote stations.

2. A system according to claim 1, wherein a check oscillator unit is provided for a series of oscillating units, the check oscillator unit being suitably connected whereby it may transmit a signal indicating non-failure in the series.

3. A system according to claim 1, wherein means are provided whereby surge feedback or D.C. reflection on to the feed cable to the oscillator units is prevented.

4. The system of claim 1 further including oscillator means connected to the cable beyond at least one of the remote stations operative in dependency on cable power to transmit a master signal through the cable to the near station, and indicating means at the near station responsive to failure of the master signal.

5. An electronic indicator system adapted to indicate at a near station "all correct" or "failure" conditions at any one of a number of remote stations, the system comprising crystal transistor oscillatory units each having a frequency different to the others and each coupled to electric control means of apparatus to be monitored at one of the remote stations, the coupling including contacts which, when closed, cause the unit to be inoperative and when open, permit the unit to function normally thereby rendering the system to "fail safe," means for tuning each unit, a co-axial cable for transmitting the different frequencies of the units to the near station and also for supplying power to the units from the near station, a common amplifier at the near station for amplifying the outputs from the units, a crystal gate filter for each of the units, amplifying and detecting stages for the filters, and a relay operated by the output from each crystal gate filter, the relay having contacts which are so arranged that a red or green lamp may be lit according to the conditions being monitored.

6. An electronic indicator and control system adapted to indicate at a near station "all correct" or "failure" conditions at any one of a number of remote stations and also to enable switching control at at least one remote station from the near station, the system comprising crystal transistor oscillaory units for generating different frequencies disposed at the near station and at the remote stations, each remote station comprising at least one unit coupled to electrical control means of apparatus to be monitored at said stations, the coupling including contacts which, when closed, cause the unit to be inoperative and when open permit the unit to oscillate, thereby rendering the indicator system "fail safe," means for tuning each unit, a coaxial cable for transmitting the different frequencies of the units at the remote stations to the near station and also for supplying power to those units from the near station, a common amplifier at the near station for amplifying the outputs from the units at the remote stations, a crystal gate filter at the near station for each of the remote units, amplifying and detecting stages for the filters, indicating means at the near station connected to the output from each filter to indicate "all correct" or "failure" conditions at each of the remote stations, amplifier means at least at said one remote station connected with the near station for amplifying a signal from a unit at the near station, and relay switching means at the said one remote station connected with the amplifier means for selective response to the operation of a unit at the near station, whereby relay switching means at that remote station may be controlled by a unit at the near station.

References Cited by the Examiner

UNITED STATES PATENTS

| | | | |
|---|---|---|---|
| 1,465,932 | 8/23 | Colpitts | 340—171 |
| 2,148,578 | 2/39 | Pullis | 340—171 X |
| 2,493,145 | 1/50 | Jaffe | 340—171 |
| 2,640,973 | 6/53 | Cleaver | 340—182 |
| 2,683,869 | 7/54 | Norris et al. | 340—171 |
| 2,695,399 | 11/54 | Martin | 340—171 X |
| 2,784,264 | 3/57 | Hansen et al. | 179—175.31 |
| 2,842,753 | 7/58 | Ewen | 340—171 |
| 2,894,246 | 7/59 | Graffenried | 340—182 |
| 2,910,579 | 10/59 | Jones et al. | 340—171 |

NEIL C. READ, *Primary Examiner.*

BENNETT G. MILLER, *Examiner.*